Jan. 17, 1950 J. A. OPPEL 2,495,127
THREE-STAGE RETARDED ELECTROMAGNETIC DEVICE
Filed June 4, 1945 2 Sheets-Sheet 1
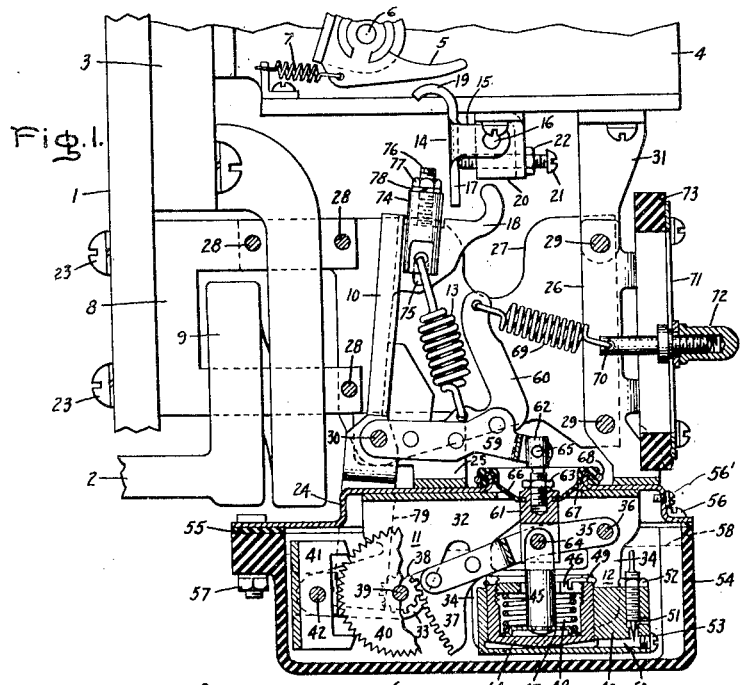
Inventor:
John A. Oppel,
by Harry E. Dunham
His Attorney.

Jan. 17, 1950   J. A. OPPEL   2,495,127
THREE-STAGE RETARDED ELECTROMAGNETIC DEVICE
Filed June 4, 1945   2 Sheets-Sheet 2
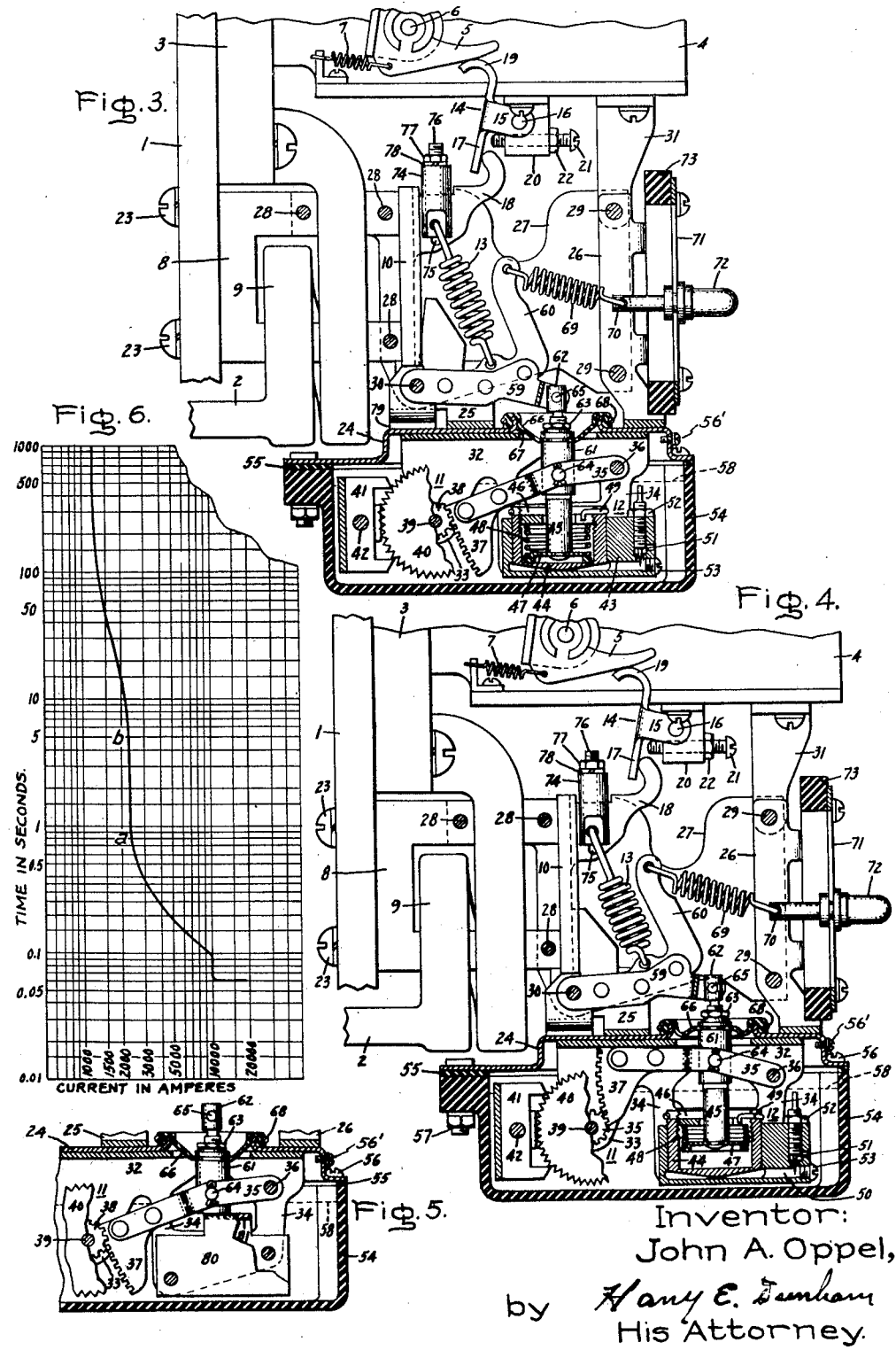
Inventor:
John A. Oppel,
by Harry E. Dunham
His Attorney.

Patented Jan. 17, 1950

2,495,127

UNITED STATES PATENT OFFICE 2,495,127

THREE-STAGE RETARDED ELECTROMAGNETIC DEVICE

John A. Oppel, Upper Darby, Pa., assignor to General Electric Company, a corporation of New York Application June 4, 1945, Serial No. 597,465

2 Claims. (Cl. 175—372)

My invention relates to improvements in time element electromagnetic devices and more particularly to improvements in selective time element electromagnetic tripping devices for circuit breakers. More specifically, my invention relates to improvements in selective long and short time delay shockproof mechanism for controlling the attraction of the armature of electromagnetic devices such as are disclosed in Figs. 1 to 4, inclusive, of and claimed in the copending application of Gerald H. Syrovy and Joseph W. Seaman, Serial No. 597,464, filed concurrently herewith, and assigned to the same assignee as this invention.

In the control of circuit breakers under abnormal circuit conditions either by relays or by direct trip devices, a selective or discriminating timing action based on the degree of over current is usually desirable in order to avoid unnecessary tripping. Thus, for example, in motor starting a relatively long time delay in tripping is desirable to carry the motor through the relatively high current starting period. Such relatively long time delay is, in general, safe only for a comparatively small range in overload current values. On the other hand, when synchronizing over a relatively large range in phase difference, much larger abnormal currents may occur. The time delay in tripping should accordingly be relatively short for a comparatively large range in such larger abnormal currents. For faults in the nature of short circuits, substantially instantaneous tripping may be desirable. Moreover, in order to avoid false operation in consequence of shocks, especially when used on warcraft, time element devices whether designed as direct trip devices or otherwise must be shockproof.

Also, in order to provide fault protection with maximum continuity of service where a plurality of circuit breakers are arranged in series in a circuit extending from a generator through a bus section to a feeder and thence to some load such as a motor, the overcurrent tripping devices on the various load, feeder, and main supply circuit breakers must be coordinated so as to effect opening of only the circuit breaker nearest the fault. Thus, for a fault on the load side of the motor circuit breaker, only this circuit breaker should open, and for a fault on the feeder, only the feeder circuit breaker should open. Similarly, for a fault between the feeder circuit breaker and the bus tie circuit breaker, only the latter should open, and for a fault between the bus tie circuit breaker and the generator circuit breaker, only the generator circuit breaker should open.

In order to accomplish such selective tripping of the different circuit breakers by means of selective long and short time delay overcurrent tripping devices, the minimum operating currents for the long time delay devices must be so adjusted that each of the circuit breakers on the line requires less current than the immediately preceding circuit breaker, that is, the next circuit breaker on the generator side. Also, for any value of short time delay operating current above the minimum operating value, each circuit breaker must open in less time than the immediately preceding circuit breaker, that is, the next circuit breaker on the generator side. Furthermore, in order to minimize the resultant damage to equipment, the operating time of the maximum overcurrent trip devices should be kept to a minimum. Obviously, in order to have satisfactory discriminating long and short time delay operation, the current-time characteristics of the tripping devices of the different circuit breakers must not intersect. Also, the time delay characteristic for the circuit breaker nearest the motor load must be such as to give relatively long times in order to avoid tripping on the transient inrush current required to start the motor and yet permit substantially instantaneous tripping for fault currents exceeding the transient starting current. In case of a relatively long conductor between the motor circuit breaker and the motor, a fault in or near the motor may not produce a short circuit current of sufficient magnitude to trip the motor circuit breaker instantaneously. In this case, the long time delay of the trip device associated with the motor circuit breaker will insure the clearance of such faults. To operate selectively with the circuit breaker nearest the motor, the generator, bus tie and feeder circuit breakers must have selective long and short time delay tripping. For currents above the instantaneous trip setting of the circuit breaker nearest the motor, the time delay of the preceding circuit breakers can be relatively short and need be long enough only to permit operation of the preceding circuit breakers, that is, the circuit breakers nearer the generator. In the case of a relatively long feeder, it is possible that a fault on the far end might not produce a short circuit current of sufficient magnitude to operate the trip device on the feeder circuit breaker. For this reason, it is desirable to equip the feeder circuit breaker with a time delay device which will also operate on lower values of current after a relatively long time delay. Accordingly, the feeder circuit breaker should have both long time delay and short time delay tripping as well as instantaneous tripping at high values of current when required to back up smaller circuit breakers. In other words, in order to obtain the desired selectivity in a set of series connected circuit breakers, at least some of the circuit breakers must have a three-stage time-current characteristic embodying relatively long time, relatively short time and instantaneous features.

Some time element electroresponsive devices have embodied both the instantaneous trip feature and the short time delay range overcurrent trip feature. As far as I know, however, such devices have too high a minimum pick-up for relatively small overloads such as occur in motor starting. Even if such devices were set for a lower pick-up, there would not be sufficient time delay, for example, to carry through the motor starting period. Other time delay electroresponsive devices have embodied the instantaneous trip feature and the long time delay overload trip feature. Devices embodying an instantaneous response and a time delay overcurrent response have been termed dual overload trips. Such devices, in general, have included two armatures or other features which render them bulky and therefore difficult and costly to apply to existing types of circuit breakers. Except for the device disclosed in the Syrovy and Seaman application, supra, I am not aware of any time element electromagnetic device which embodies the three features of instantaneous response for short circuit currents, short time delay response over a comparatively large range in relatively high overcurrent values, and a long time delay response over a comparatively small range in relatively low overcurrent values.

An object of my invention is to provide an improved time element electromagnetic device which has a relatively long time of response over a predetermined range of variation of an electric quantity, a relatively short time of response over another intermediate predetermined range of variation of the electric quantity embracing higher values thereof, and a substantially instantaneous time of response for still higher values of the quantity. Another object of my invention is to provide an improved time element electromagnetic device which has successive long and short time element response characteristic throughout its operating range. Still another object of my invention is to provide an improved three-stage time element response electromagnetic device which has suitable rigidity of structure and which is compact, readily adaptable to existing circuit breakers, and compartively simple to adjust for each stage of its response characteristic. A further object of my invention is to provide an improved time element electromagnetic device in which the desired three-stage time element response characteristic is obtained with the use of only one armature. A still further object of my invention is to provide a substantially shock-proof time element electromagnetic device. These and other objects of my invention will hereinafter appear in more detail.

In accordance with my invention, I provide an improved time element electromagnetic device comprising means for effecting a relatively short time delay in the movement of the armature of the device to the attracted position when the winding of the device is energized by currents within a predetermined range of values and a relatively long time delay when the winding is energized by currents below the lower limit of such predetermined range and for permitting a substantially instantaneous movement of the armature to its attracted position when the winding i energized by currents above the upper limit o such predetermined range of values, the mountin of said time delay effecting means being immovable by shocks relatively to the armature.

My invention will be better understood from the following description when considered in connection with the accompanying two sheets o drawings, and its scope will be pointed out in th appended claims.

In the accompanying two sheets of drawings Fig. 1 is a side elevation, partly in section, of a tim element electromagnetic device embodying my invention as applied to the tripping of circui breakers with the armature shown in the unattracted position; Fig. 2 is a view similar to Fig. 1 showing the parts as positioned at the end of the relatively long time delay operation; Fig. 3 is a view similar to Fig. 1 showing the parts as positioned at the end of a substantially instantaneous time operation; Fig. 4 is a view similar to Fig. 1 showing the parts as positioned at the end of a relatively short time delay operation; Fig. 5 is a partial side elevation, partly in section, of a modification of the embodiment of my invention shown in Figs. 1-4 as adapted to only instantaneous and short time delay tripping; Fig. 6 is a time-current characteristic typical of the embodiment of my invention as shown in Figs. 1-4; and Fig. 7 is a partial side elevation, partly in section, of a modification of the embodiment of my invention shown in Figs. 1-4 as adapted to only instantaneous tripping.

For the purpose of illustrating my invention, I have shown an embodiment thereof in a time element electromagnetic device as applied to the tripping of a circuit breaker in response to predetermined conditions of abnormal current flow through the circuit breaker. As far as my invention is concerned, the particular type of circuit breaker is immaterial, but I have shown parts of an automatic trip-free air circuit breaker such as that disclosed, for example, in United States Letters Patent 2,227,160, issued December 31, 1940. Only such parts as are essential to an understanding of my invention are shown. These parts are the mounting base or panel 1 of suitable insulating material, lower stud 2, lower stationary contact block 3, mechanism frame 4, trip latch 5 pivotally supported on the frame at 6, and spring 7 for biasing the trip latch to the latching position shown in Fig. 1.

The illustrated embodiment of my invention comprises a magnetic core 8, an energizing winding 9 therefor, and an armature 10. In accordance with my invention, I provide means such as an escapement 11 for effecting a relatively short time delay in the movement of the armature 10 to the attracted position when the winding 9 is energized by currents within a predetermined intermediate range of values, means such as a dashpot 12 for effecting a relatively long time delay in the movement of the armature 10 to the attracted position when the winding 9 is energized by currents below the lower limit of said range of values and means including a spring 13 for permitting a substantially instantaneous movement of the armature 10 to the attracted position when the winding 9 is energized by current above the upper limit of said range of values. As shown, the winding 9 is arranged around one leg of the core 8 and is connected in series between the lower stud 2 and the lower stationary contact block 3.

For effecting the release or tripping movement of the trip latch 5 upon movement of the armature 10 to the attracted position, I provide an intermediate latch releasing member such as a lever 14 having a transverse arm 15 pivotally supported at 16 so that the lower portion 17 of the lever extends into the path of movement of a tripping lug 18 secured to the armature for movement therewith. As shown, the upper portion of the lever 14 is curved to form a shoe 19 which, upon clockwise rotation of the lever as the armature 10 moves to the attracted position, engages the tail of the latch 5 to rotate it counterclockwise to the releasing position shown in Figs. 2, 3 and 4. The pivot 16 is supported on the frame 4 by suitable means such as a bracket 20. This bracket is provided with means such as a screw 21 and a lock nut 22 for adjusting the clearance between the shoe and the latch for the normal latched closed position of the circuit breaker. The core 8 is secured to the panel 1 by suitable means such as screws 23.

For supporting the escapement 11 and the dashpot 12 so as to be immovable relatively to the armature 10, I provide suitable means such as a dished plate 24 to which is suitably secured near the left end a short U-shaped bracket 25 and near the right end a long U-shaped bracket 26. For mounting the parts in the desired position relatively to the core 8 and the trip latch 5, I provide side plates 27 which are suitably secured to the core 8 at 28 and at 29 to the legs of the long bracket 26. A pivotal support for the armature 10, such as a pin 30, also passes through the side plates 27 and the legs of the short bracket 25 to support the left end of the dished plate 24. For further rigidity and alignment, angle brackets 31 are secured to the circuit breaker frame 4 and at 29 to the upper end of the legs of the long U-shaped bracket 26.

For rigidly supporting the escapement 11 and the dashpot 12 from the dished plate 24, I provide a U-shaped bracket 32 which is suitably secured to the underside of the plate 24. This bracket has depending leg portions 33 and 34 to which the escapement and dashpot are suitably attached. In order to minimize the possibility of false operation in consequence of shock when my invention is applied, for example, to circuit breakers on warcraft, the escapement 11 is of a shock-proof double-pawl type comprising an operating arm 35 which is pivotally supported at 36 between the legs 34 of the bracket 32. On the free end of the arm 35 there is a segmental gear 37 which meshes with a pinion 38 pivotally supported at 39 between the bracket legs 33. Rigidly associated with the pinion 38 for rotation therewith is a ratchet wheel 40 on which rides a double pawl 41 centrally pivotally supported at 42 between bracket legs 33. Since the time action of the escapement 11 is dependent on the weight of the pawl 41, the time response of the escapement can be varied by adding to or removing weight from the pawl or by substituting pawls of different weights.

As shown, the dashpot 12 comprises a cylinder block 43 in which is mounted a piston 44 provided with a piston rod 45. For the desired intermediate time delay range, the piston rod 45 is arranged for movement relatively to the piston for currents above a predetermined value but for currents below this value to move as a unit with the piston. Because of these two different responses, I designate such a dashpot as a dual action dashpot. For this dual action, the piston 44 is hollow and is provided with an adjustably mounted head 46 between which and a rigid diaphragm 47 secured to the lower end of the piston rod 45 there is positioned suitable holding means such as a compression spring 48. The stress on this spring 48 can be varied by turning the head 46 relatively to the piston 44. To hold the head 46 in any predetermined position relatively to the piston, there is provided a snap lock ring 49 which seats in a circumferential recess on the outside of the piston and engages registering openings in the top of the piston and the head. The cylinder block 43 is provided with a channel 50 for entrance of suitable fluid under the piston 44 by way of an adjustable entry comprising a valve 51 which is held in any set position by a lock nut 52. For short time pick-up adjusting and testing purposes, there is provided a relatively large opening for entrance of fluid to the cylinder. Normally this opening is sealed by suitable means such as a screw 53. With this screw removed, the retarding action of the dashpot is practically negligible, and testing and adjustment of the spring 69 can readily be made.

For housing the escapement 11 and the dashpot 12 and providing a reservoir for the desired dashpot fluid, a container 54 and an intervening gasket 55 are secured to the dished plate 24 by suitable means such as screws 56 and bolts 57. In order to avoid insofar as practically possible variation in dashpot timing with change in temperature, I preferably use a suitable lubricating fluid whose viscosity variation with change in temperature is a minimum. One such fluid is known as silicone oil. This oil is the subject matter of a copending application, Serial No. 463,814, filed October 29, 1942, by Winton I. Patnode, now Patent No. 2,469,888, granted May 10, 1949. This oil has a relatively low viscosity index and is not only suitable for the desired dashpot action but also lubricates the escapement mechanism and to some extent increases the duration of its timing. The level of the oil in the container 54 is indicated by the broken line 58. In order that time element electroresponsive devices embodying my invention may be shipped with oil in the container 54 and yet be vented so as to operate freely when mounted in place, there is provided suitable means such as a sealing screw 56' which may be removed for venting purposes after the device is mounted in position on the switchboard or other support.

For controlling the movement of the armature 10 to the attracted position with varying degrees of time delay dependent upon different ranges of current in the coil 9, I provide a movable member such as a lever 59 which is pivotally supported on the pin 30 and which has an upwardly extending arm 60. The lever 59 is connected to the escapement 11 and to the dashpot 12 by a reciprocable element comprising the piston rod 45 and a yoke 61 which has an adjustably positioned head 62 provided with a lock nut 63. The yoke 61 is pivotally secured at 64 to both the escapement arm 35 and the piston rod 45, and the head 62 is pivotally secured at 65 to the operating lever 59. With the escapement 11 thus connected to the dashpot 12, it will be obvious that the dashpot is also rendered shock-proof since any shock tending to rotate the weighted pawl 41 in either direction will hold the escapement and parts attached thereto against movement. Also, with the housing for the escapement 11 and the dashpot 12 rigidly mounted, undesirable shock initiated operation of the device, possible with a movable housing, is eliminated.

In order to avoid the friction load of bushing devices and the like and yet prevent oil leakage from the container 54, the yoke 61 is seated in an elastic diaphragm 66 which is held against an upstanding curved flange 67 in the dished part of the plate 24 by a retainer clamping ring 68. The diaphragm 66 may be made from a rubber-like material which is not subject to deterioration by oil. Examples of such materials in the so-called artificial rubbers are well known to the art. In order to secure the diaphragm 66 to the yoke 61, a suitable circumferential recess is provided in the yoke. Also, the hole in the diaphragm 66 through which the yoke 61 is inserted is made materially smaller than the recessed diameter of the yoke in order to provide a bulge or fullness sufficient to permit the desired movement of the reciprocable element 61—62.

For obtaining time delayed movement of the armature 10 to the attracted position when the winding 9 is energized by current below a predetermined high value, I connect the spring 13 between the armature 10 and the lever 59. For current below such high value, the spring 13 is essentially such a rigid member that the movement of the armature 10 is delayed by the escapement 11 for currents between said predetermined high value and a predetermined low value; and for currents less than the low value, the armature is delayed primarily by the dashpot 12 and negligibly by the escapement 11. Inasmuch, however, as the delay due to the escapement 11 is quite small in comparison with the delay due to the dashpot 12, the time of movement of the armature to the attracted position for currents less than the low value is not materially affected by the escapement 11.

The spring 48 is so proportioned and the head 46 so adjusted that, for currents within the range between the low and high values, the piston rod 45 moves upward relatively to the piston 44 under the relatively short delay due to the escapement 11 since the piston is practically held immovable by the relatively slow action of the dashpot 12. For currents less than the low value, the spring 48 does not yield, and the piston 44 and piston rod 45 move upward as a unit to provide the relatively long dashpot time delay in the movement of the armature to the attracted position. The lower limit of the current pick-up for the long time delay response of the armature 10 is determined by suitable yielding means such as a spring 69 which is connected between the arm 60 of the lever 59 and a pin 70. As shown, this pin projects through a vertical slot in a scale plate 71 and can be clamped in different positions thereon by a cap nut 72 to vary the tension in the spring 69 and thereby the low current pick-up of the armature 10. The scale plate 71 may conveniently be mounted on an insulating support 73 which is secured to the long-legged U-shaped bracket 26. Although both springs 48 and 69 have to be overcome in the escapement delay response of the armature 10, the additional amount of force required to stretch the spring 69 is relatively small in comparison with the force required to compress the spring 48.

For adjusting the instantaneous pick-up or response of the armature 10, a yoke 74 is movably positioned on the lug 18 with its arms over a slot 75 in the lug. The upper end of the spring 13 passes through the slot 75 and holes in the yoke arms. At the upper end, the yoke 74 is provided with an adjusting screw 76 which is threaded into the yoke member 74 and bears against a recess in the upper edge of the lug 18. In order to prevent undesired movement of the adjusting screw 76, a lock nut 77 and washer 78 may be provided.

In order to prevent false movements of the armature 10 about its axis of rotation 30 to the attracted position in consequence of shocks, the armature may be dynamically balanced in its plane of rotation by counterweights 79 such that the pivot 30 extends through the center of gravity of the mass of the armature and the weights.

In the event that the slow or dashpot time delay action is not desired, the dashpot 12 can be omitted as shown in Fig. 5. In this case, the dashpot is replaced by an inverted U-shaped bracket 80 which is so secured to the downwardly extending portions 34 of the bracket 32 that its cross portion 81 provides an abutment for the yoke member 61 to limit the downward movement thereof. With this arrangement, the device will have only the instantaneous and short time response. Also, it will be obvious that by omitting the mechanism of the escapement 11 from the embodiment of my invention shown in Fig. 1 or merely removing the operating arm 35, the device will have only the instantaneous and long time delay response. If only instantaneous response is desired, then both the escapement 11 and the dashpot 12 may be omitted, as shown in Fig. 7. In this arrangement, the dished plate 24 is replaced by a plate 24' to which the lever 59 is rigidly secured against movement by suitable means such as a threaded extension 81 on the head 62, nuts 63', washers 82 and lock washers 83. With this arrangement, movement of the armature can occur only by stressing the spring 13, the tension of which will be set for a desired instantaneous response.

In Fig. 6, I have illustrated a time-current characteristic obtainable with a time element electromagnetic device such as that illustrated and as it may be adjusted for a circuit breaker rated 600 amperes carrying capacity. In this Fig. 6, the coordinates along each axis are plotted on a logarithmic basis. It will be observed that for currents from about 1200 amperes to about 2400 amperes, that is, two to four times normal, the time delay varies from about 1000 seconds down to 5 seconds; but from about 2400 amperes to 10,000 amperes, that is, four to seventeen times normal, the time delay varies from about 0.8 second down to about 0.1 second; and for all currents in excess of 10,000 amperes, the time delay is about 0.06 second, that is, practically instantaneous.

Assuming the parts positioned as shown in Fig. 1 and also that overload current appears in the coil 9 below, for example, the 1200 ampere value, then neither the spring 13 nor the spring 48 will have exterted thereon by the attraction on the armature a force sufficient to cause either of them to yield. The armature 10 will, however, be attracted with a force sufficient to cause the spring 69 to yield slowly because of the action of the dashpot 12. As the oil flows through the channel 50 restricted by the valve 51, the piston 44 and the parts associated therewith rise to the position shown in Fig. 2 until the armature 10 reaches the attracted position. During this movement of the armature, the lug 18 engages the lower portion 17 of the lever 14, thereby turning this lever clockwise to effect the counterclockwise or releasing movement of the latch 5. The parts are now positioned as shown in Fig. 2. As soon as the circuit through the circuit breaker is open, the trip coil 9 is, of course, deenergized whereupon the armature 10 and associated parts return to the position shown in Fig. 1.

Assuming now that the circuit breaker is closed and an overload current appears in the coil 9 of such a magnitude, for example above 10,000 amperes, as to stretch the spring 13, then the armature 10 will move to the attracted position substantially instantaneously in spite of the drag due to the dashpot 12 and the escapement 11. The parts will then be positioned as shown in Fig. 3.

If, however, the current in the coil 9 is within the range between a predetermined low value, for example 2400 amperes, and a predetermined high value, for example 10,000 amperes, then the force on the armature 10 is sufficient to compress the dashpot spring 48 and also stretch the spring 69 without appreciable movement of the piston 44 because of the dashpot drag thereon and the parts are positioned as shown in Fig. 4. In this case, the delay of the armature 10 is dependent on the timing action of the escapement 11, such timing action being relatively small, however, in comparison with the time delay of the dashpot 12.

If an abnormal circuit condition is cleared before the expiration of the time for which a particular electro-responsive device is set, then that device should reset promptly in order to avoid any undesirable operation. Such operation may occur because of overshooting which is due to the inertia of the moving parts. In devices embodying my invention, any tendency to overshoot on the long time delay operation is minimized since the motion of the piston 44 is very slow. Also, since the escapement 11 inherently tends quickly to stop the moving parts as soon as the actuating force of the flux produced by the coil 9 ceases, any tendency to overshoot during the short time delay responses is minimized. In addition to these features, the moving parts are relatively light in weight and therefore have little inertia.

In the embodiment of my invention shown in Fig. 5, the time-current characteristic of the device would embody only the lower portion of the characteristic shown in Fig. 6, that is, from point $a$ downward, since there is no dashpot to produce the slow time delay portion of the characteristic extending from point $b$ upward.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, a circuit breaker tripping electromagnet having a balanced pivoted armature, selective current-calibrating and time-delay mechanism for controlling the attraction of said armature including an adjustable calibrating spring connected at one end with the armature for yielding to allow substantially instantaneous attraction of the armature when the energizing current of the electromagnet exceeds the upper limit of a selective time delay range of current values predetermined by the separate adjustment of said spring, a pivoted gear segment connected with the other end of said spring, an independently adjustable calibrating spring connected with said gear segment for separately predetermining the lower limit of the selective time-delay range, an escapement ratchet wheel having a driving pinion meshing with the gear segment and a balanced double pawl escapement element operated by the ratchet wheel for effecting a relatively short time-delay in the movement of said armature to its attracted position when the energizing current of the electromagnet is within said selective time-delay range, and a dashpot having a movable piston provided with a separately adjustable spring connection with the gear segment for effecting a relatively long time-delay in the movement of the armature to its attracted position when the energizing current of the electromagnet is below a value in the selective time-delay range separately predetermined by the adjustment of said spring and for yielding when the current exceeds said value.

2. In combination, a circuit breaker tripping electromagnet having a balanced pivoted armature, selective current-calibrating and time-delay mechanism for controlling the attraction of said armature including an operating lever pivoted coaxially with the armature and having an adjustable calibrating spring connection with the armature for yielding to allow substantially instantaneous attraction of the armature when the energizing current of the electromagnet exceeds the upper limit of a selective time-delay range of current values predetermined by the separate adjustment of said spring, an independently adjustably calibrating spring connected with said lever for separately predetermining the lower limit of the selective time delay range, a pivoted gear segment having a reciprocable operating element connected with said lever, an escapement ratchet wheel having a driving pinion meshing with the gear segment and a balanced double pawl escapement element operated by the ratchet wheel for effecting a relatively short time-delay in the movement of the armature to its attracted position when the energizing current of the electromagnet is within said range, and a dashpot having a movable piston provided with an adjustable calibrating spring connection with said reciprocable element for effecting a relatively long time-delay in the movement of the armature to its attracted position when the energizing current of the electromagnet is below a value in the selective time-delay range separately predetermined by the adjustment of said spring and for yielding when the current exceeds said value.

JOHN A. OPPEL.

REFERENCES CITED

The following references are of record in the file of this patent:

UNITED STATES PATENTS

| Number | Name | Date |
|---|---|---|
| 991,108 | Turbayne | May 2, 1911 |
| 1,123,288 | Hellmund | Jan. 5, 1915 |
| 1,216,570 | Hohn | Feb. 20, 1917 |
| 1,250,746 | Wolff | Dec. 18, 1917 |
| 1,622,044 | Miller | Mar. 27, 1927 |
| 1,702,204 | Dudley | Feb. 12, 1929 |
| 1,738,461 | Stevens | Dec. 3, 1929 |
| 1,764,382 | Ashbaugh | June 17, 1930 |
| 2,060,492 | Dyer | Nov. 10, 1936 |
| 2,393,736 | Bennett et al. | Jan. 29, 1946 |
| 2,419,892 | Graves | Apr. 29, 1947 |
| 2,439,165 | Graves | Apr. 6, 1948 |